United States Patent
Wang et al.

(10) Patent No.: US 12,407,933 B2
(45) Date of Patent: Sep. 2, 2025

(54) TARGET OBJECT TRACKING METHOD, CAMERA, AND COMPUTER-READABLE STORAGE MEDIUM

(71) Applicant: Shenzhen Reolink Technology Co., Ltd., Shenzhen (CN)

(72) Inventors: Aijun Wang, Shenzhen (CN); Han Yang, Shenzhen (CN); Jiuming Li, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/785,031

(22) Filed: Jul. 26, 2024

(65) Prior Publication Data

US 2024/0388802 A1 Nov. 21, 2024

Related U.S. Application Data

(63) Continuation-in-part of application No. PCT/CN2023/085998, filed on Apr. 3, 2023.

(30) Foreign Application Priority Data

May 5, 2022 (CN) .......................... 202210484280.2

(51) Int. Cl.
*H04N 23/69* (2023.01)
*H04N 23/61* (2023.01)
*H04N 23/695* (2023.01)

(52) U.S. Cl.
CPC ............. *H04N 23/69* (2023.01); *H04N 23/61* (2023.01); *H04N 23/695* (2023.01)

(58) Field of Classification Search
CPC ...... H04N 23/69; H04N 23/61; H04N 23/695; H04N 23/60
See application file for complete search history.

(56) References Cited

U.S. PATENT DOCUMENTS

| 2015/0350606 | A1 | 12/2015 | Khanfor | |
| 2019/0109992 | A1* | 4/2019 | Momoki | .................. G02B 7/04 |

FOREIGN PATENT DOCUMENTS

| CN | 108200339 | 6/2018 |
| CN | 111683204 | 9/2020 |
| CN | 113518168 | 10/2021 |

\* cited by examiner

*Primary Examiner* — Tat C Chio
(74) *Attorney, Agent, or Firm* — ScienBiziP, P.C.

(57) ABSTRACT

A target object tracking method, a camera, and a computer-readable storage medium are provided. The camera includes a telephoto lens and a wide-angle lens. The camera captures a telephoto image by the telephoto lens, and captures a wide-angle image by the wide-angle lens. When a target object is detected in the wide-angle image, a first zoom magnification of the wide-angle image and a zoom magnification of switching lenses are obtained. The wide-angle image is digitally zoomed according to the first zoom magnification if the first zoom magnification is less than or equal to the zoom magnification of switching lenses. Otherwise, if the first zoom magnification is greater than the zoom magnification of switching lenses, the telephoto image is digitally zoomed to output a tracking image of the target object when the target object is detected in the telephoto image.

20 Claims, 4 Drawing Sheets

TARGET OBJECT TRACKING METHOD, CAMERA, AND COMPUTER-READABLE STORAGE MEDIUM

CROSS-REFERENCE TO RELATED APPLICATIONS

This application is a continuation of International Application No. PCT/CN2023/085998, filed on Apr. 3, 2023, which claims priority to Chinese Patent Application No. 202210484280.2, filed on May 5, 2022. The disclosures of the aforementioned applications are hereby incorporated by reference in their entireties.

TECHNICAL FIELD

This application relates to a field of monitoring technology, and in particular, to a target object tracking method, a camera, and a computer-readable storage medium.

BACKGROUND

An automatic tracking camera is an integrated camera that integrates and expands functional devices such as a lens, a platform, and a conventional camera. In a video surveillance, the automatic tracking camera can identify movements of an object within a monitoring range, and automatically control the platform to track the object that is moving. Therefore, the camera used in the video surveillance becomes more intelligent and convenient.

The automatic tracking camera currently on the market generally uses a combination of an electric zoom lens and a Pan, Tilt (PT) platform. During an object tracking process, a target object is firstly detected, and then the PT platform is rotated to adjust a shooting direction of the camera according to a change of a position of the target object. At a same time, a zoom command is sent to the electric zoom lens according to a size or a distance of the target object, so that the target object maintains a large portion of a monitoring image, thereby achieving tracking and magnifying the target object.

SUMMARY

This application is to provide a target object tracking method, a camera, and a computer-readable storage medium.

A first aspect of this application provides the target object tracking method, comprising: obtaining a telephoto image captured by a telephoto lens and a wide-angle image captured by a wide-angle lens, and detecting whether a target object is present in the wide-angle image; in response that the target object is present in the wide-angle image, obtaining a first zoom magnification of the wide-angle image, and obtaining a zoom magnification of switching lenses, wherein the zoom magnification of switching lenses is a ratio of a focal length of the telephoto lens to a focal length of the wide-angle lens; In response that the first zoom magnification is less than or equal to the zoom magnification of switching lenses, outputting a tracking image of the target object by digitally zooming the wide-angle image according to the first zoom magnification; in response that the first zoom magnification is greater than the zoom magnification of switching lenses, detecting whether the target object is present in the telephoto image, and in response that the target object is present in the telephoto image, outputting the tracking image of the target object by digitally zooming the telephoto image.

Optionally, the obtaining the first zoom magnification of the wide-angle image comprises: obtaining a pixel width w0 and a height h0 of the target object, a pixel width w1 and a height h1 of the wide-angle image, and an expected pixel ratio e of the target object in a first cropping frame, the first cropping frame being used for cropping the wide-angle image; calculating the first zoom magnification m of the wide-angle image according to a formula m=sqrt(e/(w0*h0/w1*h1)).

Optionally, the outputting the tracking image of the target object by digitally zooming the wide-angle image according to the first zoom magnification comprises: obtaining size parameters of the first cropping frame according to the first zoom magnification, and obtaining position parameters of the first cropping frame according to a coincidence of a center of the first cropping frame with a center of the target object; determining the first cropping frame according to the size parameters and the position parameters; cropping the wide-angle image according to the first cropping frame, and outputting the tracking image of the target object by scaling the cropped wide-angle image proportionally according to a preset target resolution.

Optionally, the cropping the wide-angle image according to the first cropping frame, and outputting the tracking image of the target object by scaling the cropped wide-angle image proportionally according to the preset target resolution comprises: determining whether the first cropping frame exceeds a boundary range of the wide-angle image; In response that the first cropping frame exceeds the boundary range of the wide-angle image, adjusting a position of the first cropping frame and making the first cropping frame be within the boundary range of the wide-angle image; cropping the wide-angle image according to the first cropping frame that has been adjusted, and outputting the tracking image of the target object by scaling the cropped wide-angle image proportionally according to the preset target resolution.

Optionally, the method further comprises: detecting whether to switch to digitally zoom the telephoto image, and inserting a preset number of transition frames between the telephoto image and the cropped wide-angle image, in response to switching to digitally zoom the telephoto image; outputting the tracking image of the target object according to the transition frames before switching to digitally zoom the telephoto image.

Optionally, the outputting the tracking image of the target object by digitally zooming the telephoto image comprises: obtaining a second zoom magnification of the telephoto image; determining a second cropping frame in the telephoto image according to the second zoom magnification; cropping the telephoto image according to the second cropping frame, and outputting the tracking image of the target object by scaling the cropped telephoto image proportionally according to the target resolution.

Optionally, the method further comprises: determining whether the target object is in a preset static area in the wide-angle image; in response that the target object is not in the preset static area in the wide-angle image, adjusting a shooting direction of the wide-angle lens to make the target object be in a center of the wide-angle image.

A second aspect of this application provides a camera, comprising: a telephoto lens, a wide-angle lens, a storage device and at least one processor, the storage device being configured to store one or more program instructions; the at least one processor being configured to invoke the program instructions stored in the storage device to enable the camera to execute the above-mentioned target object tracking method.

A third aspect of this application provides a non-transitory computer-readable storage medium, wherein the non-transitory computer-readable storage medium stores program instructions, which, when executed on a camera, enable the camera to execute the above-mentioned target object tracking method.

The camera of this application obtains a telephoto image captured by a telephoto lens and a wide-angle image captured by a wide-angle lens, and detects whether a target object is present in the wide-angle image. The camera obtains a first zoom magnification of the wide-angle image and obtains a zoom magnification of switching lenses when the target object is present in the wide-angle image. The lens switching factor is a ratio of a focal length of the telephoto lens to a focal length of the wide-angle lens. The camera digitally zooms the wide-angle image according to the first zoom magnification to output a tracking image of the target object when the first zoom magnification is less than or equal to the zoom magnification of switching lenses. The camera further detects whether the target object is present in the telephoto image when the first zoom magnification is greater than the zoom magnification of switching lenses. If the target object is present in the telephoto image, the camera further digitally zooms the telephoto image to output a tracking image of the target object. The camera of this application switches between the telephoto lenses and the wide-angle lenses, and then digitally zooms the wide-angle image or the telephoto image to output a tracking image of a current target object. Compared with the traditional object tracking method using an electric zoom lens, the target object tracking method applied to the camera of this application not only has a faster tracking speed, but also the target object can be clearly displayed throughout the tracking process, thereby improving the visual effect of the tracking image.

DETAILED DESCRIPTION

This application provides a method for tracking a target object, a camera, and a computer-readable storage medium. Compared with an existing tracking using an electric zoom lens, a method of switching between a telephoto lens and a wide-angle lens, and then digitally zooming a wide-angle image or a telephoto image to output a tracking image of a current target object, not only has a fast tracking speed, but also clearly display the target object throughout a tracking process, thereby improving a visual effect of a tracking image.

Terms "first", "second", "third", "fourth", etc. (if any) in the specification and claims of this application and the above drawings are used to distinguish similar objects, and are not necessarily used to describe a specific order or a sequence. It should be understood that data used in this way can be interchanged where appropriate, so that embodiments described herein can be implemented in an order other than that illustrated or described herein. In addition, terms "including" or "having" and any variations thereof are intended to cover non-exclusive inclusions, for example, a process, a method, a system, a product or a device that includes a series of steps or units is not necessarily limited to those steps or units that are clearly listed, but may include other steps or units that are not clearly listed or inherent to these processes, methods, products or devices.

For ease of understanding, an embodiment of a schematic process of a target object tracking method of this application is described below.

Figure 1:
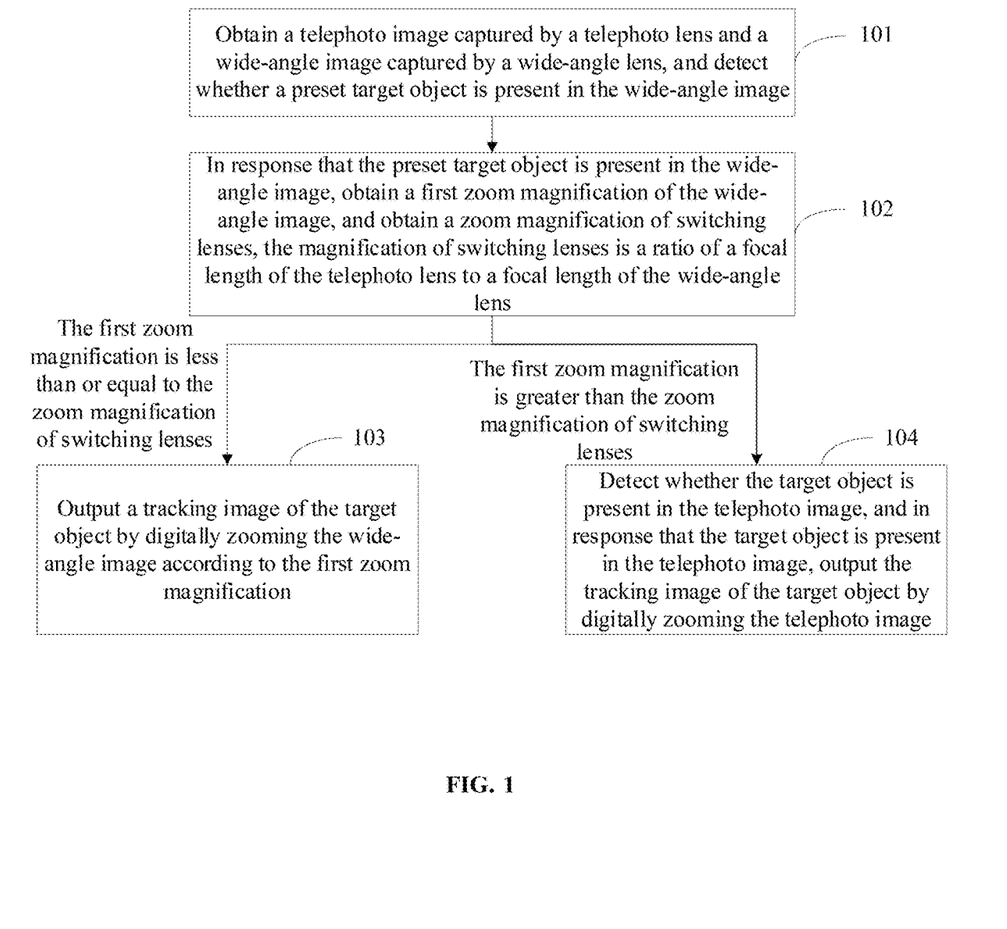
FIG. 1 is a schematic flowchart of a target object tracking method according to an embodiment of this application.

FIG. 1 is a schematic flowchart of a target object tracking method according to an embodiment of this application. The target object tracking method can be applied to a camera device such as a camera 700 shown in FIG. 6.

Step 101, the camera 700 obtains a telephoto image captured by a telephoto lens and a wide-angle image captured by a wide-angle lens, and detects whether a preset target object is present in the wide-angle image;

In some embodiments of this application, the camera 700 can be a dual-lens camera with long and short focal lengths. The dual-lens camera includes a telephoto lens and a wide-angle lens. Both the telephoto lens and the wide-angle lens are fixed-focus lenses, and a focal length of the telephoto lens is greater than a focal length of the wide-angle lens.

During a process of a video surveillance, the dual-lens camera obtains a telephoto image captured by the telephoto lens and a wide-angle image captured by the wide-angle lens at the same time, and detects whether there is the preset target object in the wide-angle image In some embodiments, the target object can be a person, an animal, a car or other movable object. An existing algorithm for detecting a contour of an object or other AI (Artificial Intelligence) algorithms can be used to detect whether there is the preset target object in the wide-angle image. This is not limited in this embodiment of this application.

Step 102, in response that the preset target object is present in the wide-angle image, the camera 700 obtains a first zoom magnification of the wide-angle image, and obtains a zoom magnification of switching lenses. In this embodiment, the zoom magnification of switching lenses is a ratio of the focal length of the telephoto lens to the focal length of the wide-angle lens.

In response that the preset target object is detected in the wide-angle image, the first zoom magnification of the wide-angle image is obtained. The first zoom magnification is used for digitally zooming the wide-angle image. A digital zoom refers to changing a field of view of an original image by cropping and stretching, thereby simulating a zoom effect, a relationship between a zoom magnification and a cropping size of an image is as follows: A pixel width of a cropped image=a pixel width of an original image/a zoom magnification; a pixel height of the cropped image=a pixel height of the original image/the zoom magnification. Wherein the "/" is used to denote a division operation, for example, the "a pixel width of an original image/a zoom magnification" means that the pixel width of an original image is divided by the zoom magnification.

In one embodiment, a step of obtaining the first zoom magnification of the wide-angle image may include steps of: obtaining a pixel width w0 and a height h0 of the target object, a pixel width w1 and a height h1 of the wide-angle image, and a preset expected pixel ratio e of the target object in a first cropping frame, the first cropping frame being used for cropping the wide-angle image; and calculating the first zoom magnification "m" of the wide-angle image according to a formula m=sqrt(e/(w0*h0/w1*h1)), where the "sqrt" is used to denote an arithmetic square root, the "/" is used to denote a division operation as described above, and the "*" is used to denote a multiplication operation, for example, w0*h0 means that w0 times h0.

Figure 2:
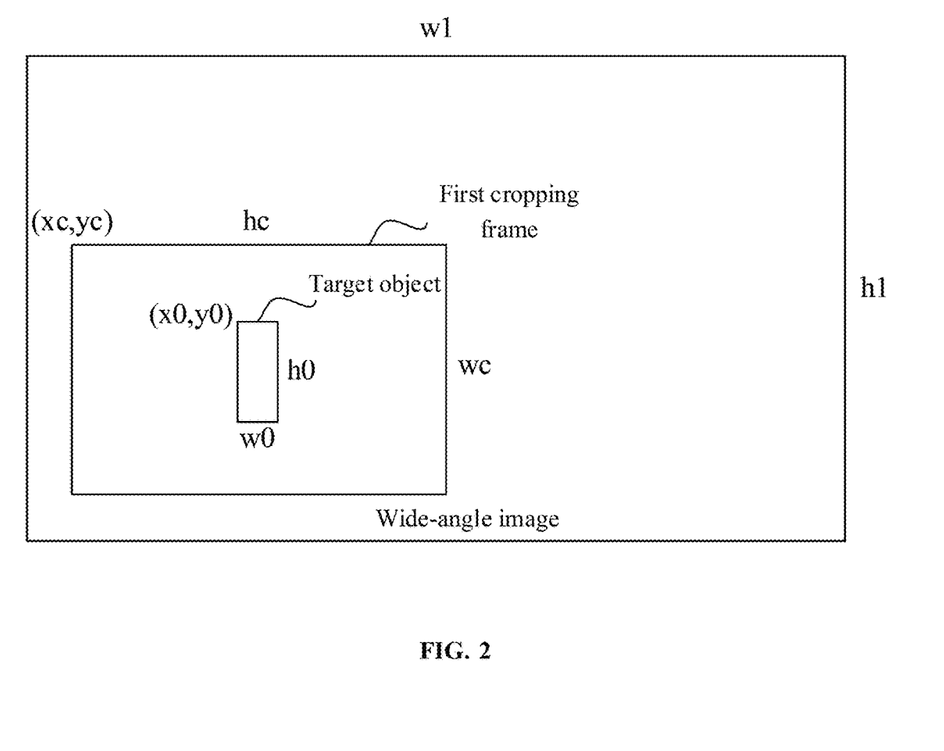
FIG. 2 is a schematic diagram of determining a first cropping frame in the target object tracking method according to an embodiment of this application.

Specifically, refer to FIG. 2, which is a schematic diagram of determining the first cropping frame in the target object tracking method according to an embodiment of this application. Assume that the pixel width and the height of the target object are "w0" and "h0" respectively, the pixel width and the height of the wide-angle image are "w1" and "h1" respectively, and the expected pixel ratio of the target object in the first cropping frame is "e", where the "w0" and "h0" can be obtained by the AI algorithm, the "w1" and "h1" are known parameters of the wide-angle lens, and the "e" is a preset empirical value. Combined with the above-mentioned relationship between the zoom magnification and the cropping size of the image, the first zoom magnification of the wide-angle image can be calculated as the formula m=sqrt(e/(w0*h0/w1*h1)), in particular, when m<1, take m=1, that is, a minimum zoom magnification of the wide-angle image is "1".

The above method of calculating the first zoom magnification of the wide-angle image can ensure that a pixel ratio of the target object in the first cropping frame is always the expected pixel ratio. That is, the target object in the tracking image is not too large or too small, which is conducive to improving the visual effect of the tracking image. Of course, the first zoom magnification of the wide-angle image can also be a preset empirical value, which can be flexibly set during a specific implementation.

According to a principle of digital zoom: a perspective when the wide-angle image is digitally magnified by a coefficient "s" times, is consistent with a telephoto perspective, where s=f2/f1, "f1" represents the focal length of the wide-angle lens, and "f2" represents the focal length of the telephoto lens, "f2/f1" means that "f2" is divided by "f1". According to this principle, the embodiment uses the coefficient "s" as the zoom magnification of switching lenses, and by comparing sizes of "m" and "s", the wide-angle image or the telephoto image is selected for digitally zooming to output the tracking image of the target object.

When the first zoom magnification is less than or equal to the zoom magnification of switching lenses, step 103 is executed, and the camera 700 digitally zooms the wide-angle image is according to the first zoom magnification for outputting the tracking image of the target object.

In this embodiment, when m≤s, the wide-angle image is selected for digitally zooming to output a tracking image of the target object.

Furthermore, the above-mentioned step 103 may include steps of: obtaining size parameters of the first cropping frame according to the first zoom magnification, and obtaining position parameters of the first cropping frame according to a coincidence of a center of the first cropping frame with a center of the target object; determining the first cropping frame according to the size parameters and the position parameters; cropping the wide-angle image according to the first cropping frame, and outputting the tracking image of the target object by scaling the cropped wide-angle image proportionally according to a preset target resolution.

Continuing with reference to FIG. 2, assuming that a pixel width and a height of the first cropping frame are "wc" and "hc" respectively, and coordinates of an upper left corner are (xc, yc), combined with the above-mentioned relationship between the zoom magnification and the cropping size of the image, it can be calculated that wc=w1/m, and hc=h1/m. In addition, it is known that the coordinates of the upper left corner of the target object detected by AI are (x0, y0), then according to a fact that the center of the first cropping frame coincides with the center of the target object. That is, horizontal and vertical coordinates are the same, and (2xc+wc)/2=(2x0+w0)/2, (2yc+hc)/2=(2y0+h0)/2, and xc=(2*x0+w0−wc)/2, yc=(2*y0+h0−hc)/2 can be calculated, where the "+" is used to denote an addition operation, and the "−" is used to denote a subtraction operation, the "*" is used to denote a multiplication operation, and the "/" is used to denote a division operation.

According to the size parameters "wc", "hc", and the position parameters (xc, yc) calculated above, the first cropping frame can be determined in the wide-angle image.

Furthermore, the step of cropping the wide-angle image according to the first cropping frame, and outputting the tracking image of the target object by scaling the cropped wide-angle image proportionally according to the preset target resolution may include steps of: determining whether the first cropping frame exceeds a boundary range of the wide-angle image; in response that the first cropping frame exceeds the boundary range of the wide-angle image, adjusting a position of the first cropping frame and making the first cropping frame within the boundary range of the wide-angle image.

In this embodiment, when the target object is close to an edge of the wide-angle image, the first cropping frame centered on the target object may exceed the boundary range of the wide-angle image. In this case, the position of the first cropping frame needs to be corrected.

Figure 3:
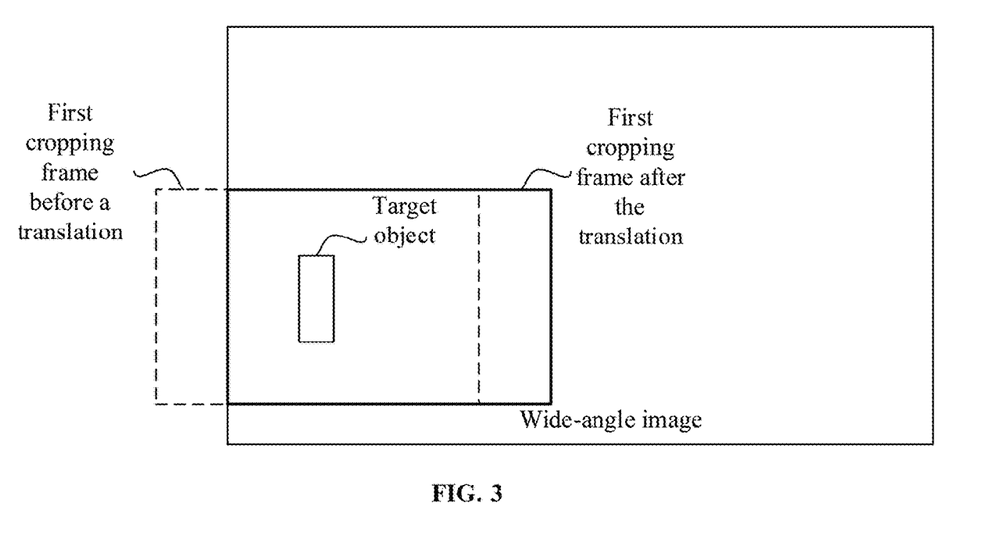
FIG. 3 is a schematic diagram of correcting a position of the first cropping frame in the target object tracking method according to an embodiment of this application.

FIG. 3 is a schematic diagram of correcting the position of the first cropping frame in the target object tracking method in accordance with an embodiment of this application. After the first cropping frame is determined, whether there are at least two vertices of the first cropping frame that fall outside the boundary range of the wide-angle image is determined. If so, it is determined that the first cropping frame exceeds the boundary range of the wide-angle image. It can be understood that when the first cropping frame exceeds the boundary range of the wide-angle image, the first cropping frame can be flexibly translated up, down, left, and right so that the first cropping frame is within the boundary range of the wide-angle image. For example, when the first cropping frame exceeds a left boundary range of the wide-angle image, the first cropping frame can be translated to a right to make all four vertices of the first cropping frame within the boundary range of the wide-angle image.

The above method of adjusting the position of the first cropping frame does not change a size of the first cropping frame. Therefore, when the target object is close to the edge of the wide-angle image, the pixel ratio of the target object in the first cropping frame is still the expected pixel ratio, thereby ensuring that a size of the target object in the tracking image does not change suddenly, and further improving the visual effect of the tracking image.

After the first cropping frame is determined, the wide-angle image is cropped according to the first cropping frame, and the cropped wide-angle image is proportionally scaled according to the preset target resolution, thereby the tracking image of the target object is output. The target resolution is a resolution of a tracking video, which can be flexibly set as needed. By acquiring tracking images of the target object at different times, the tracking video of the target object can be generated.

On the contrary, when the first zoom magnification is greater than the zoom magnification of switching lenses, step 104 is executed to detect whether the target object is present in the telephoto image, and if the target object is present in the telephoto image, the camera 700 digitally zooms the telephoto image for outputting the tracking image of the target object.

In this embodiment, when m>s, whether there is a target object in the telephoto image is further detected. A detection method may include detecting whether the target object is within a telephoto perspective in the wide-angle image. If the target object is within the telephoto perspective in the wide-angle image, the camera 700 determines that the target object is present in the telephoto image. Since when m>s and the target object is present in the telephoto image, continuing to digitally zoom (e.g., enlarge) the wide-angle image according to the first zoom magnification "m", causes the tracking image to become blurred, in order to maintain the tracking image being clear, the telephoto image is switched at this time, that is, the telephoto image is digitally zoomed to output the tracking image of the target object.

In particular, when m>s, but the target object is not present in the telephoto image, it is not possible to switch to the telephoto image, that is, the wide-angle image is still digitally zoomed to output the tracking image of the target object.

It should be noted that another wide-angle image can also be provided while outputting the tracking video of the target object, so that a user can experience a tracking effect while information under a wide-angle perspective is retained.

This embodiment switches between the telephoto lens and the wide-angle lens, and then digitally zooms the wide-angle image or the telephoto image to output the tracking image of the current target object. Compared with the traditional object tracking method using the electric zoom lens, the target object tracking method applied to the camera of this embodiment not only has a faster tracking speed, but also the target object can be clearly displayed throughout the tracking process, thereby improving the visual effect of the tracking image.

Furthermore, based on the first embodiment of the target object tracking method in this application, a second embodiment of the target object tracking method in this application is provided.

In this embodiment, after the step of cropping the wide-angle image according to the first cropping frame and proportionally scaling the cropped wide-angle image according to the preset target resolution to output the tracking image of the target object, the method may further include steps of: detecting whether it is currently necessary to switch to digitally zoom the telephoto image for outputting the tracking image of the target object, and if it is currently necessary to switch to digitally zoom the telephoto image for outputting the tracking image of the target object, inserting a preset number of transition frames between the telephoto image and the cropped wide-angle image; and outputting the tracking image of the target object according to the transition frames before switching to digitally zoom the telephoto image for outputting the tracking image of the target object.

Figure 4:
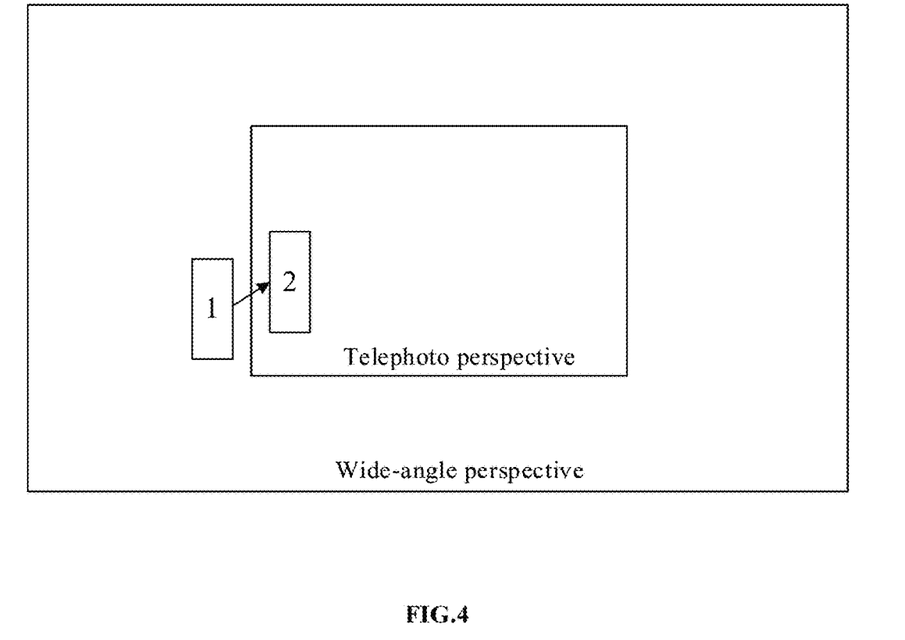
FIG. 4 is a schematic diagram of switching from a wide-angle tracking to a telephoto tracking in the target object tracking method according to an embodiment of this application.

FIG. 4 is a schematic diagram of switching from a wide-angle tracking to a telephoto tracking in the target object tracking method according to an embodiment of this application. There is such a situation in the tracking process, when the target object is at a position 1 in a wide-angle perspective, a tracking image A is obtained by digitally zooming the wide-angle image, and the target object is at a center of the image A. The target object moves to a position 2 in the telephoto perspective at a next moment. At this time, a tracking image B is obtained by switching to digitally zoom the telephoto perspective. In this case, the tracking image is directly switched from the image A to the image B, which causes position jumps of the target object in the tracking image (from a middle position to an edge position), thereby affecting the visual effect of the tracking image. For this reason, it is necessary to performing a smooth processing on the images during a switching process.

Specifically, in a process of obtaining the tracking image by digitally zooming the wide-angle image, it can be detected whether a condition of "the first zoom magnification is greater than the zoom magnification of switching lenses, and the target object is present in the telephoto image" is satisfied currently. If the condition is satisfied, it is necessary to switch to track the telephoto image. At this time, a number of transition frames can be inserted between the telephoto image and the cropped wide-angle image. The number of transition frames can be flexibly set, and positions of the transition frames can be determined according to the position parameters of the telephoto image and the position parameters of the cropped wide-angle image. Before switching to the tracking image of the target object by digitally zooming the telephoto image, the tracking image of the target object is output according to the transition frames.

This embodiment further improves the visual effect of the tracking image by smoothing the tracking images during the process of switching from the wide-angle tracking to the telephoto tracking.

Furthermore, based on the first embodiment of the target object tracking method in this application, a third embodiment of the target object tracking method in this application is provided.

In this embodiment, the step of digitally zooming the telephoto image to output the tracking image of the target object may include steps of: obtaining a second zoom magnification of the telephoto image; determining a second cropping frame in the telephoto image according to the second zoom magnification; cropping the telephoto image according to the second cropping frame, and scaling the cropped telephoto image proportionally according to the target resolution to output the tracking image of the target object.

Specifically, supposing that the second zoom magnification of the telephoto image is m'. Combined with the above digital zoom principle, the second zoom magnification of the telephoto image is calculated as m'=m/s, where "m" is the first zoom magnification of the wide-angle image, and "s" is the zoom magnification of switching lenses. That is, a perspective after the telephoto image is centered and magnified by m' times is consistent with a perspective after the wide-angle image is centered and magnified by m times. Then, the second cropping frame based on the telephoto image is determined according to the second zoom magnification "m'".

When determining the second cropping frame, as an implementation method, AI can be used to directly detect the target object in the telephoto image to obtain parameters (e.g., a size, a position, etc.) of the target object in the telephoto image, and then an algorithm similar to an algorithm used for the above-mentioned wide-angle image is used to calculate size parameters and position parameters of the second cropping frame to determine the second cropping frame.

As another implementation method, due to a limitation of hardware performance (for example, an AI computing power of an ordinary chip in an embedded platform is limited), AI can generally only be used to detect the target object in the wide-angle image. Therefore, when switching to the telephoto image for calculating the second cropping frame of the telephoto image, the size parameters of the target object cannot be directly obtained through AI. At this time, a conversion of the parameters of the target object is required, that is, the size parameters "w0", "h0" and the position parameters (x0, y0) of the target object in the wide-angle image are converted to the telephoto image, so as to determine the second cropping frame in the telephoto image. In this embodiment, the method for converting the parameters of the target object is as follows:

The pixel width and the height of the wide-angle image are known as "w1" and "h1" respectively, a pixel width and a height of a third cropping frame corresponding to the wide-angle image centered and magnified by the coefficient "s" times are set to be "wt" and "ht" respectively, and coordinates of the upper left corner are set to be (xt, yt), then wt=w1/s, ht=h1/s, xt=(w1−w1/s)/2, yt=(h1−h1/s)/2. Given that a pixel width and a height of the telephoto image are "w2" and "h2" respectively, and the parameters of the target object in the converted telephoto image includes the coordinates (xf, yf) of upper left corner, a width "wf", and a height "hf", then xf=sw*(x0−xt), yf=sh*(y0−yt), wf=sw*w0, hf=sh*h0, where sw=w2/wt, sh=h2/ht.

After completing the conversion of the above parameters of the target object, similar to the wide-angle, according to m' and the parameters of the target object in the converted telephoto image, a width wc', a height hc' and coordinates (xc', yc') of the upper left corner of the second cropping frame can be calculated, where wc'=w2/m', hc'=h2/m', xc'=(2*xf+wf−wc')/2, yc'=(2*yf+hf−hc')/2. In this way, the second cropping frame can be determined in the telephoto image.

A correction of a cross-border of the second cropping frame is similar to that of the wide-angle, and will not be described here. Afterwards, the telephoto image is cropped according to the second cropping frame, and the cropped telephoto image is scaled proportionally according to the preset target resolution, thereby outputting the tracking image of the target object.

This embodiment outputs the tracking image of the current target object by switching between the telephoto lens and the wide-angle lens. The algorithm is simple, and the target object can be clearly displayed throughout the tracking process, thereby improving the visual effect of the tracking image.

Furthermore, based on the first embodiment of the target object tracking method in this application, a fourth embodiment the target object tracking method in this application is provided.

In this embodiment, before the steps of obtaining the first zoom magnification of the wide-angle image and obtaining the zoom magnification of switching lenses, the method may further include steps of: determining whether the target object is in a preset static area in the wide-angle image; in response that the target object is not in the preset static area in the wide-angle image, controlling the wide-angle lens to rotate and making the target object within a center of the wide-angle image.

Figure 5:
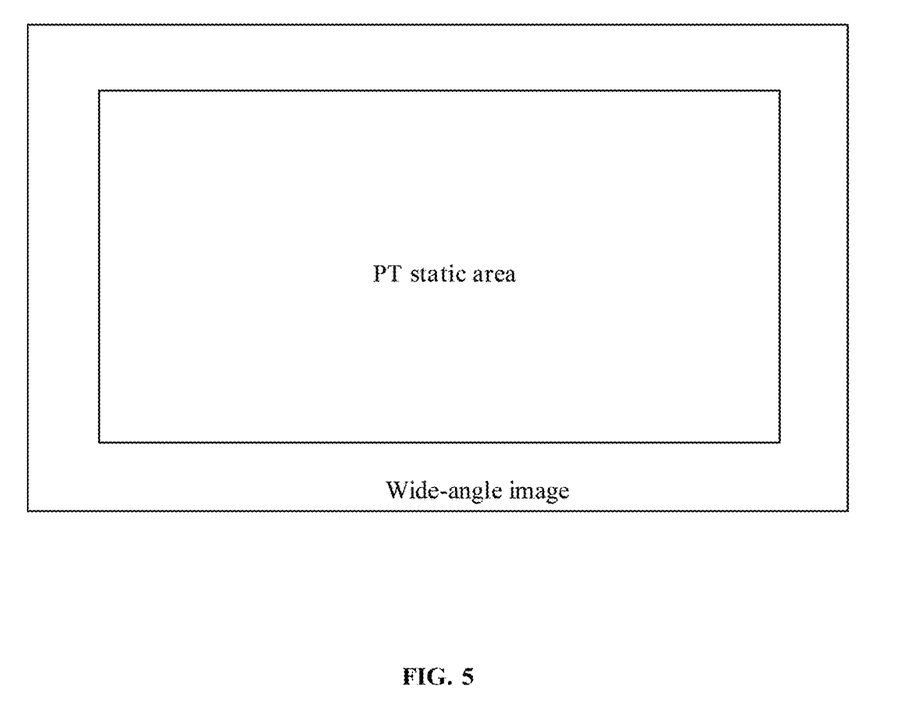
FIG. 5 is a schematic diagram of a PT static area in the target object tracking method according to an embodiment of this application.

FIG. 5 is a schematic diagram of a PT static area in the target object tracking method in accordance with an embodiment of this application. In this embodiment, the dual-lens camera with long and short focal lengths may further include a PT platform, which can drive the wide-angle lens and/or the telephoto lens to rotate left and right/up and down as the target object moves. In order to reduce a frequent rotation of the PT and a tracking hysteresis during the tracking process, when the preset target object is detected in the wide-angle image, it can be first determined whether the target object is in the preset static area (i.e., PT static area) in the wide-angle image. When the target object is in this area, the PT is not rotated, but a tracking with a digital zoom is used. When the target object is not in this area, in order to avoid losing the target object, the PT is controlled to rotate so that the target object is located in the center of the wide-angle image, and then the first zoom magnification of the wide-angle image and the zoom magnification of switching lenses are obtained to execute a subsequent tracking method.

This embodiment reduces the frequent rotation of the PT during the tracking process by setting the PT static area, which is beneficial to saving power and further improving a fluency of the tracking video.

Figure 6:
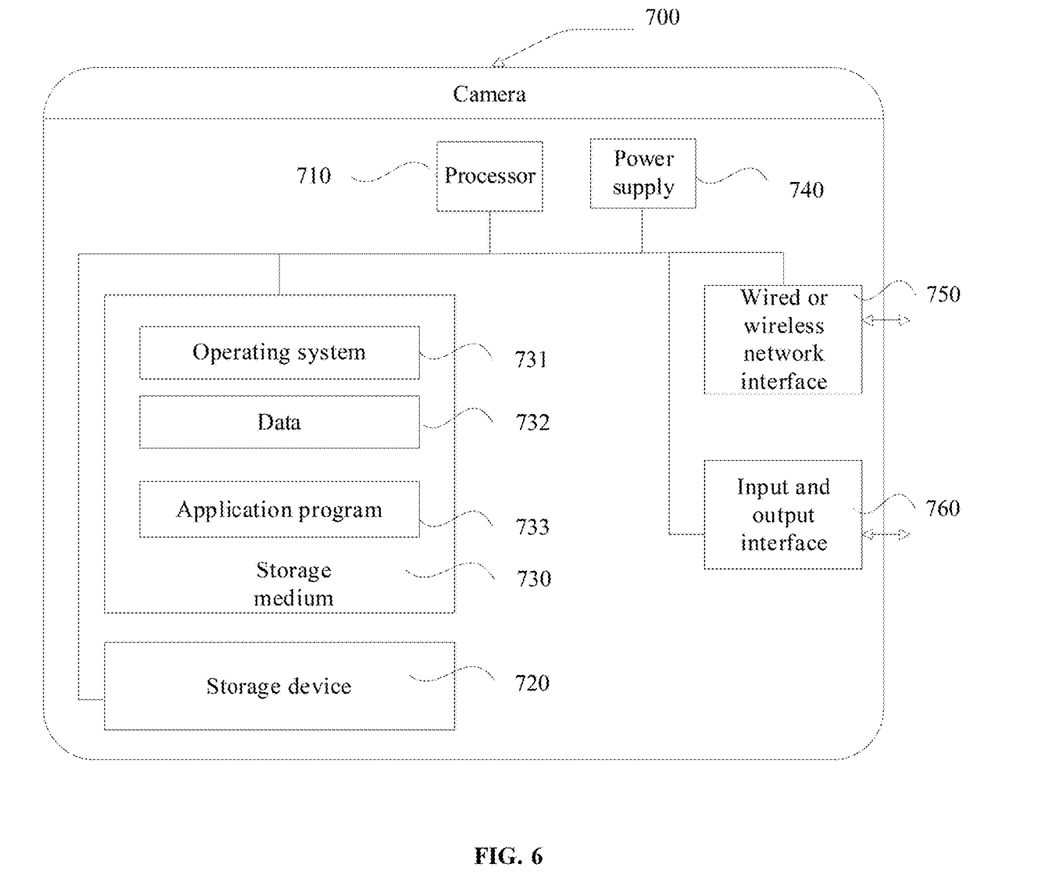
FIG. 6 is a schematic diagram of a structure of a camera provided in an embodiment of this application.

FIG. 6 is a schematic diagram of a structure of a camera provided in an embodiment of this application. In this embodiment, the camera 700 may have relatively large differences due to different configurations or performances, and may include one or more CPUs (central processing units) 710 and a storage device 720, and one or more storage mediums 730 (such as one or more mass storage devices) storing one or more application programs 733 or data 732. Among them, the storage device 720 and the storage medium 730 may be temporary storages or permanent storages. The application programs stored in the storage medium 730 may include one or more modules (not shown in the figure), and each module may include a series of program instructions for operations on the camera 700. Furthermore, the processor 710 may be configured to communicate with the storage medium 730 and execute a series of instructions for operations in the storage medium 730 on the camera 700.

The camera 700 may also include one or more power supplies 740, one or more wired or wireless network interfaces 750, one or more input and output interfaces 760, and/or one or more operating systems 731, such as Windows Server, Mac OS X, Unix, Linux, FreeBSD, etc. Those skilled in the art can understand that the structure of the camera shown in FIG. 6 does not limit the camera, and may include more or less components than shown in the figure, or combine certain components, or arrange the components differently.

This application also provides a camera, which includes a telephoto lens, a wide-angle lens, a storage device and a processor. The storage device stores program instructions, and when the program instructions are executed by the processor, the processor executes the steps of the target object tracking method in the above-mentioned embodiments.

This application also provides a computer-readable storage medium, which may be a non-transitory computer-readable storage medium or a volatile computer-readable storage medium, among them, one or more program instructions are stored in the computer-readable storage medium, and when the program instructions are executed on an electronic device such as the camera 700 shown in FIG. 6, the electronic device performs all or some of the steps of the target object tracking method in the above-mentioned embodiments.

The skilled in the art can understand that the above-mentioned integrated modules or units can be stored in a computer-readable storage medium, if the above-mentioned integrated modules or units are implemented in a form of software functional units and sold or used as independent products. Based on this understanding, the technical solution of this application, in essence, or a part that contributes to the prior art, or all or part of the technical solution can be embodied in a form of a software product. A computer software product is stored in a storage medium, including several instructions for a computer device (which can be a personal computer, a server, or a network device, etc.) to perform all or part of the steps of the method described in each embodiment of this application. The aforementioned storage medium includes a U disk, a mobile hard disk, a read-only memory (ROM), a random access memory (RAM), a disk or an optical disk, etc., and other medium that can store program codes.

The above embodiments are only used to illustrate the technical solution of this application, rather than to limit this application. Although this application has been described in detail with reference to the aforementioned embodiments, an ordinary skill in the art should understand that the technical solution described in the aforementioned embodiment may still be modified, or some of technical features may be replaced by equivalents. However, these modifications or replacements do not deviate the essence of the corresponding technical solution from the spirit and scope of the technical solution of the embodiment of this application.

What is claimed is:

1. A target object tracking method, comprising:
    obtaining a telephoto image captured by a telephoto lens and a wide-angle image captured by a wide-angle lens, and detecting whether a target object is present in the wide-angle image;
    in response that the target object is present in the wide-angle image, obtaining a first zoom magnification of the wide-angle image, and obtaining a zoom magnification of switching lenses, wherein the zoom magnification of switching lenses is a ratio of a focal length of the telephoto lens to a focal length of the wide-angle lens;
    in response that the first zoom magnification is less than or equal to the zoom magnification of switching lenses, outputting a tracking image of the target object by digitally zooming the wide-angle image according to the first zoom magnification;
    in response that the first zoom magnification is greater than the zoom magnification of switching lenses, detecting whether the target object is present in the telephoto image; and
    in response that the target object is present in the telephoto image, outputting the tracking image of the target object by digitally zooming the telephoto image.

2. The target object tracking method according to claim 1, wherein the obtaining the first zoom magnification of the wide-angle image comprises:
    obtaining a pixel width w0 and a height h0 of the target object, a pixel width w1 and a height h1 of the wide-angle image, and an expected pixel ratio e of the target object in a first cropping frame, the first cropping frame being used for cropping the wide-angle image;
    calculating the first zoom magnification m of the wide-angle image according to a formula $m=\text{sqrt}(e/(w0*h0/w1*h1))$, wherein the "sqrt" denotes an arithmetic square root, the "/" denotes a division operation, and the "*" denotes a multiplication operation.

3. The target object tracking method according to claim 2, wherein the outputting the tracking image of the target object by digitally zooming the wide-angle image according to the first zoom magnification comprises:
    obtaining size parameters of the first cropping frame according to the first zoom magnification, and obtaining position parameters of the first cropping frame according to a coincidence of a center of the first cropping frame with a center of the target object;
    determining the first cropping frame according to the size parameters and the position parameters; and
    cropping the wide-angle image according to the first cropping frame, and outputting the tracking image of the target object by scaling the cropped wide-angle image proportionally according to a preset target resolution.

4. The target object tracking method according to claim 3, wherein the cropping the wide-angle image according to the first cropping frame, and outputting the tracking image of the target object by scaling the cropped wide-angle image proportionally according to the preset target resolution comprises:
    determining whether the first cropping frame exceeds a boundary range of the wide-angle image;
    in response that the first cropping frame exceeds the boundary range of the wide-angle image, adjusting a position of the first cropping frame and making the first cropping frame within the boundary range of the wide-angle image;
    cropping the wide-angle image according to the first cropping frame that has been adjusted, and outputting the tracking image of the target object by scaling the cropped wide-angle image proportionally according to the preset target resolution.

5. The target object tracking method according to claim 3, further comprising:
    detecting whether to switch to digitally zoom the telephoto image;
    in response to switching to digitally zoom the telephoto image, inserting a preset number of transition frames between the telephoto image and the cropped wide-angle image; and
    outputting the tracking image of the target object according to the transition frames before switching to digitally zoom the telephoto image.

6. The target object tracking method according to claim 3, wherein the outputting the tracking image of the target object by digitally zooming the telephoto image comprises:
    obtaining a second zoom magnification of the telephoto image;
    determining a second cropping frame in the telephoto image according to the second zoom magnification;
    cropping the telephoto image according to the second cropping frame, and outputting the tracking image of the target object by scaling the cropped telephoto image proportionally according to the target resolution.

7. The target object tracking method according to claim 1, wherein the method further comprises:
    determining whether the target object is in a preset static area in the wide-angle image; and
    in response that the target object is not in the preset static area in the wide-angle image, adjusting a shooting direction of the wide-angle lens and making the target object be in a center of the wide-angle image.

8. A camera, comprising:
a telephoto lens, a wide-angle lens, a storage device, and at least one processor;
the storage device being configured to store one or more program instructions;
the at least one processor being configured to invoke the program instructions stored in the storage device to enable the camera to execute a target object tracking method, the target object tracking method comprising:
obtaining a telephoto image captured by a telephoto lens and a wide-angle image captured by a wide-angle lens, and detecting whether a target object is present in the wide-angle image;
in response that the target object is present in the wide-angle image, obtaining a first zoom magnification of the wide-angle image, and obtaining a zoom magnification of switching lenses, wherein the zoom magnification of switching lenses is a ratio of a focal length of the telephoto lens to a focal length of the wide-angle lens;
in response that the first zoom magnification is less than or equal to the zoom magnification of switching lenses, outputting a tracking image of the target object by digitally zooming the wide-angle image according to the first zoom magnification;
in response that the first zoom magnification is greater than the zoom magnification of switching lenses, detecting whether the target object is present in the telephoto image;
in response that the target object is present in the telephoto image, outputting the tracking image of the target object by digitally zooming the telephoto image.

9. The camera according to claim 8, wherein the obtaining the first zoom magnification of the wide-angle image comprises:
obtaining a pixel width w0 and a height h0 of the target object, a pixel width w1 and a height h1 of the wide-angle image, and an expected pixel ratio e of the target object in a first cropping frame, the first cropping frame being used for cropping the wide-angle image;
calculating the first zoom magnification m of the wide-angle image according to a formula m=sqrt(e/(w0*h0/w1*h1)), wherein the "sqrt" denotes an arithmetic square root, the "/" denotes a division operation, and the "*" denotes a multiplication operation.

10. The camera according to claim 9, wherein the outputting the tracking image of the target object by digitally zooming the wide-angle image according to the first zoom magnification comprises:
obtaining size parameters of the first cropping frame according to the first zoom magnification, and obtaining position parameters of the first cropping frame according to a coincidence of a center of the first cropping frame with a center of the target object;
determining the first cropping frame according to the size parameters and the position parameters; and
cropping the wide-angle image according to the first cropping frame, and outputting the tracking image of the target object by scaling the cropped wide-angle image proportionally according to a preset target resolution.

11. The camera according to claim 10, wherein the cropping the wide-angle image according to the first cropping frame, and outputting the tracking image of the target object by scaling the cropped wide-angle image proportionally according to the preset target resolution comprises:
determining whether the first cropping frame exceeds a boundary range of the wide-angle image;
in response that the first cropping frame exceeds the boundary range of the wide-angle image, adjusting a position of the first cropping frame and making the first cropping frame within the boundary range of the wide-angle image;
cropping the wide-angle image according to the first cropping frame that has been adjusted, and outputting the tracking image of the target object by scaling the cropped wide-angle image proportionally according to the preset target resolution.

12. The camera according to claim 10, wherein the target object tracking method further comprises:
detecting whether to switch to digitally zoom the telephoto image;
in response to switching to digitally zoom the telephoto image, inserting a preset number of transition frames between the telephoto image and the cropped wide-angle image; and
outputting the tracking image of the target object according to the transition frames before switching to digitally zoom the telephoto image.

13. The camera according to claim 10, wherein the outputting the tracking image of the target object by digitally zooming the telephoto image comprises:
obtaining a second zoom magnification of the telephoto image;
determining a second cropping frame in the telephoto image according to the second zoom magnification;
cropping the telephoto image according to the second cropping frame, and outputting the tracking image of the target object by scaling the cropped telephoto image proportionally according to the target resolution.

14. The camera according to claim 8, wherein the target object tracking method further comprises:
determining whether the target object is in a preset static area in the wide-angle image; and
in response that the target object is not in the preset static area in the wide-angle image, adjusting a shooting direction of the wide-angle lens and making the target object be in a center of the wide-angle image.

15. A non-transitory computer-readable storage medium having program instructions stored thereon, when the program instructions are executed by a processor of a camera, the camera is enabled to perform a target object tracking method, the target object tracking method comprising:
obtaining a telephoto image captured by a telephoto lens and a wide-angle image captured by a wide-angle lens, and detecting whether a target object is present in the wide-angle image;
in response that the target object is present in the wide-angle image, obtaining a first zoom magnification of the wide-angle image, and obtaining a zoom magnification of switching lenses, wherein the zoom magnification of switching lenses is a ratio of a focal length of the telephoto lens to a focal length of the wide-angle lens;
in response that the first zoom magnification is less than or equal to the zoom magnification of switching lenses, outputting a tracking image of the target object by digitally zooming the wide-angle image according to the first zoom magnification;

in response that the first zoom magnification is greater than the zoom magnification of switching lenses, detecting whether the target object is present in the telephoto image;

in response that the target object is present in the telephoto image, outputting the tracking image of the target object by digitally zooming the telephoto image.

16. The non-transitory computer-readable storage medium according to claim 15, wherein the obtaining the first zoom magnification of the wide-angle image comprises:

obtaining a pixel width w0 and a height h0 of the target object, a pixel width w1 and a height h1 of the wide-angle image, and an expected pixel ratio e of the target object in a first cropping frame, the first cropping frame being used for cropping the wide-angle image;

calculating the first zoom magnification m of the wide-angle image according to a formula m=sqrt(e/(w0*h0/w1*h1)), wherein the "sqrt" denotes an arithmetic square root, the "/" denotes a division operation, and the "*" denotes a multiplication operation.

17. The non-transitory computer-readable storage medium according to claim 16, wherein the outputting the tracking image of the target object by digitally zooming the wide-angle image according to the first zoom magnification comprises:

obtaining size parameters of the first cropping frame according to the first zoom magnification, and obtaining position parameters of the first cropping frame according to a coincidence of a center of the first cropping frame with a center of the target object;

determining the first cropping frame according to the size parameters and the position parameters; and cropping the wide-angle image according to the first cropping frame, and outputting the tracking image of the target object by scaling the cropped wide-angle image proportionally according to a preset target resolution.

18. The non-transitory computer-readable storage medium according to claim 17, wherein the cropping the wide-angle image according to the first cropping frame, and outputting the tracking image of the target object by scaling the cropped wide-angle image proportionally according to the preset target resolution comprises:

determining whether the first cropping frame exceeds a boundary range of the wide-angle image;

in response that the first cropping frame exceeds the boundary range of the wide-angle image, adjusting a position of the first cropping frame and making the first cropping frame within the boundary range of the wide-angle image;

cropping the wide-angle image according to the first cropping frame that has been adjusted, and outputting the tracking image of the target object by scaling the cropped wide-angle image proportionally according to the preset target resolution.

19. The non-transitory computer-readable storage medium according to claim 17, wherein the target object tracking method further comprises:

detecting whether to switch to digitally zoom the telephoto image;

in response to switching to digitally zoom the telephoto image, inserting a preset number of transition frames between the telephoto image and the cropped wide-angle image; and outputting the tracking image of the target object according to the transition frames before switching to digitally zoom the telephoto image.

20. The non-transitory computer-readable storage medium according to claim 15, wherein the target object tracking method further comprises:

determining whether the target object is in a preset static area in the wide-angle image; and in response that the target object is not in the preset static area in the wide-angle image, adjusting a shooting direction of the wide-angle lens and making the target object be in a center of the wide-angle image.

* * * * *